United States Patent
Mukaiyachi

(10) Patent No.: US 11,540,026 B2
(45) Date of Patent: Dec. 27, 2022

(54) DATA RELAY APPARATUS, METHOD, DELIVERY SYSTEM, AND PROGRAM

(71) Applicant: NEC Corporation, Tokyo (JP)

(72) Inventor: Tamotsu Mukaiyachi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/423,386

(22) PCT Filed: Jan. 30, 2020

(86) PCT No.: PCT/JP2020/003330
§ 371 (c)(1),
(2) Date: Jul. 15, 2021

(87) PCT Pub. No.: WO2020/158844
PCT Pub. Date: Aug. 6, 2020

(65) Prior Publication Data
US 2022/0070544 A1    Mar. 3, 2022

(30) Foreign Application Priority Data

Jan. 31, 2019  (JP) .............................. JP2019-015429

(51) Int. Cl.
*H04N 7/173*       (2011.01)
*H04N 21/647*      (2011.01)
*H04N 21/231*      (2011.01)
*H04N 21/239*      (2011.01)

(52) U.S. Cl.
CPC ......... *H04N 21/647* (2013.01); *H04N 21/239* (2013.01); *H04N 21/23106* (2013.01)

(58) Field of Classification Search
CPC .......... H04N 21/647; H04N 21/23106; H04N 21/239
See application file for complete search history.

(56) References Cited

U.S. PATENT DOCUMENTS

| | | | |
|---|---|---|---|
| 10,165,286 B2 | 12/2018 | Sze et al. | |
| 2011/0066703 A1* | 3/2011 | Kaplan | H04N 21/222 709/219 |
| 2012/0087255 A1* | 4/2012 | Ukita | H04L 61/30 370/252 |
| 2012/0150936 A1* | 6/2012 | Yoshida | H04N 21/23805 709/201 |

(Continued)

FOREIGN PATENT DOCUMENTS

| | | |
|---|---|---|
| JP | 2015-050473 A | 3/2015 |
| JP | 2016-100681 A | 5/2016 |

(Continued)

OTHER PUBLICATIONS

Taiwanese Office Action for TW Application No. 109101435 dated Sep. 15, 2021 with English Translation.

(Continued)

*Primary Examiner* — Mulugeta Mengesha
(74) *Attorney, Agent, or Firm* — Sughrue Mion, PLLC

(57) ABSTRACT

A data relay apparatus arranged between a client apparatus and a server apparatus that delivers content, discriminates a packet based on a data size thereof, the packet transmitted from the client apparatus to the server apparatus, and detects re-buffering based on a frequency of transmission of a predetermined packet discriminated.

19 Claims, 18 Drawing Sheets

(56) References Cited

U.S. PATENT DOCUMENTS

| | | | |
|---|---|---|---|
| 2014/0362690 A1 | 12/2014 | Baduge et al. | |
| 2015/0350097 A1* | 12/2015 | Osuga | H04L 47/12 370/230 |
| 2016/0261661 A1 | 9/2016 | Taibi et al. | |
| 2017/0324795 A1 | 11/2017 | Ashida et al. | |
| 2018/0152490 A1 | 5/2018 | Hiruma et al. | |

FOREIGN PATENT DOCUMENTS

| | | |
|---|---|---|
| JP | 2016-219915 A | 12/2016 |
| JP | 2017-515329 A | 6/2017 |
| TW | 201517602 A | 5/2015 |
| WO | 2014/010171 A1 | 1/2014 |

OTHER PUBLICATIONS

International Search Report for PCT Application No. PCT/JP2020/003330, dated Apr. 14, 2020.

QUIC a New iIternet Transport: Presenter: Jana Iyengar, [searched on Dec. 25, 2018], internet (URL:ietf.org/proceedings/96/slides/slides-96-quic-5.pdf).

Russian Office Action for RU Application No. 2021122384/28(046808) dated Apr. 28, 2022 with English Translation.

Lijun HE et al.: "QoE-Driven Joint Optimization of Segment Adaptation and Resource Allocation for DASH Clients over LTE Networks", 2018.

Naomi Terada et al.: "Extracting client-side streaming QoS information from server logs", 2005.

Jiwoong Bang et al.: "Efficient RTSP-based multiple buffering and packet transmission methods for delivering OMA PoC Box service", 2012.

Deart V.Yu et al.: Investigation of the quality of service (QoS) parameters that determine the quality of user perception (QoE) streaming video when transmitting via Internet, 2013.

Taiwanese Office Communication for TW Application No. 109101435 dated Dec. 28, 2021 with English Translation.

* cited by examiner

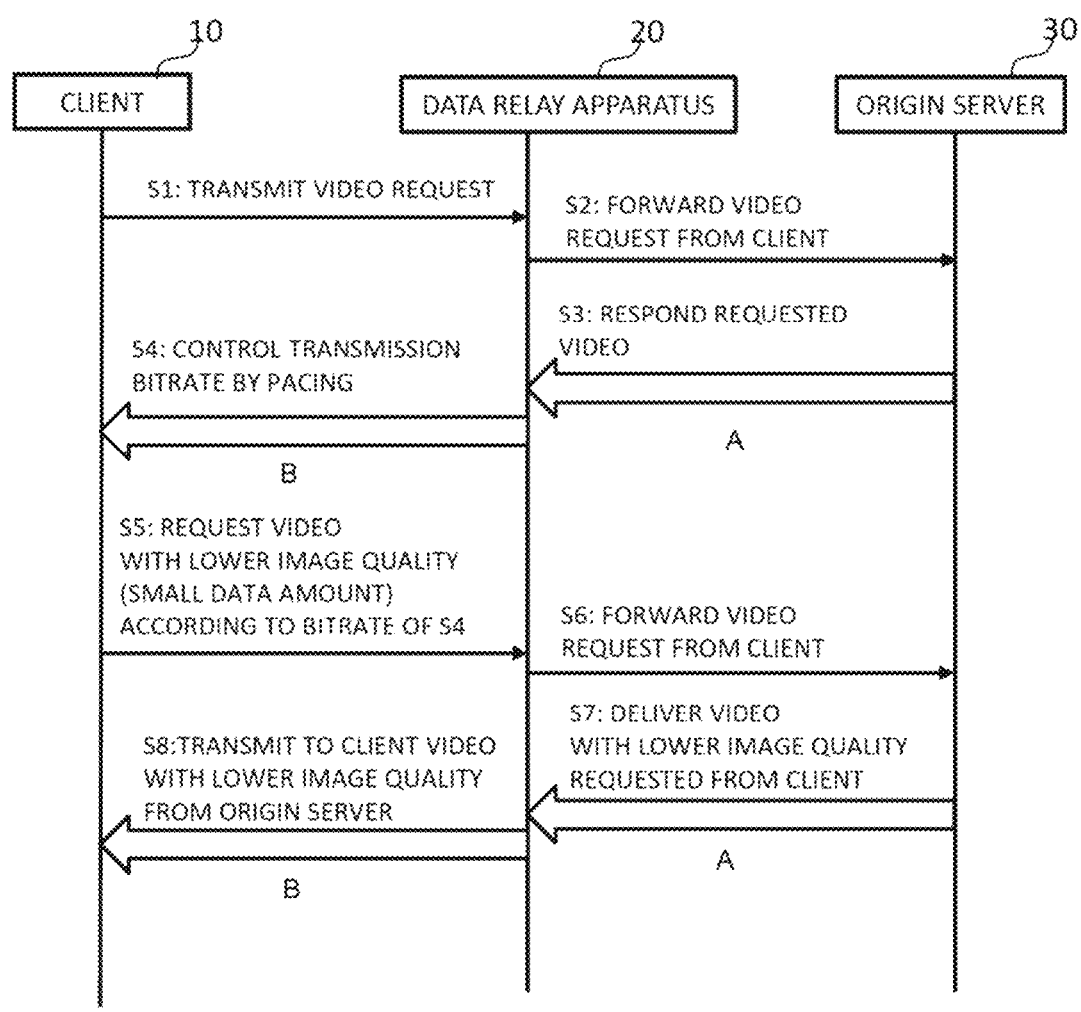

DATA RELAY APPARATUS, METHOD, DELIVERY SYSTEM, AND PROGRAM

FIELD

Reference to Related Application

This application is a National Stage Entry of PCT/JP2020/003330 filed on Jan. 30, 2020, which claims priority from Japanese Patent Application 2019-015429 filed on Jan. 31, 2019, the contents of all of which are incorporated herein by reference, in their entirety.

The present invention relates to a data relay apparatus arranged between a client and an origin server, a method, a delivery system, and a non-transitory medium storing a program.

BACKGROUND

There is an increased number of video delivery sites which employ Adaptive Bitrate (abbreviated to ABR) as a video delivery scheme. ABR is a video delivery technology which enables to smoothly playback video content with highest-possible quality according to a viewing environment. There are a plurality of ABR standards and as typical ones, there are, for example, HLS (HTTP (Hypertext Transfer Protocol) Live Streaming), MPEG-DASH (Moving Picture Expert Group Dynamic Adaptive Streaming over HTTP), etc.

ABR enables comfortable viewing of video by automatically changing video quality according to processing performance and resolution of a viewing terminal, a line speed, and so on. In order to dynamically change video quality, video data is divided, for example, as segment files (segments) every few seconds to several tens of seconds and a plurality of image qualities are prepared on a delivery server in advance. A mobile apparatus (client: also abbreviated to CL), such as a mobile phone or the like, selects a segment and a quality (image quality) to be obtained in accordance with a viewing environment, and requests a video to a delivery server (Origin Server: also abbreviated to OS). When a client requests video data from an origin server, HTTP protocol is used. A client transmits an HTTP request in which an image quality and a segment are specified to an origin server and obtains video data which is a response from the origin server.

For example, in content delivery using HLS, there is provided on a delivery server an index file (playlist) describing a URL of each segment in a single content in a playback time order, and a plurality of types of segments with different bitrates are prepared for the single content. A variant playlist is used in which a URL (Uniform resource Locator) of each playlist corresponding to each bitrate is described. A client selects a playlist corresponding to a bitrate suitable for a viewing environment among a plurality of playlists described in the variant playlist and obtains sequentially a segment described in the selected playlist to playback the content.

FIG. 1 schematically illustrates an example of temporal change (dynamic change) in an image quality by ABR scheme. It is noted that, in FIG. 1, a horizontal axis is time and a vertical axis is a vertical pixel number of image data, as each image quality. FIG. 1 schematically illustrate a situation where a video with high image quality (e.g., 720×1080p (pixels) per frame) is delivered in a segment of time 00:00-00:10, a video with low image quality (e.g., 360×480p per frame) is delivered in a segment of time 00:10-00:20, and a video with middle image quality (e.g., 480×720p) is delivered in segments of 00:20-00:30 and 00:30-0040.

ABR video delivery is broadly divided into two phases. One is a buffering phase and another is a steady phase (refer to FIG. 2). FIG. 2 schematically illustrates a time series variation of an amount of received data per unit time which a client receives from an origin server. In FIG. 2, a horizontal axis is time and a vertical axis is data amount.

In a buffering phase, a network state between the client and the origin server is observed and an appropriate quality of video/audio suitable for a viewing environment is determined. Furthermore, data is transmitted in a burst manner from the origin server in order to buffer sufficient data to start playback of a video on a client side.

In a steady phase, after a quality of a video/audio is decided in the buffering phase, the client acquires divided video data (segments) from the origin server at a constant time interval, depending on progress of a video being viewed to avoid video data buffered on the client from being depleted.

As illustrated in FIG. 2, in a client, a start of video viewing begins with a buffering phase, followed by a steady phase.

Furthermore, the steady phase may be followed by a buffering phase again (called "re-buffering").

In a client, re-buffering occurs, for example, when frame-by-frame playback of a video is carried out by a user who is viewing the video, when an image quality of a video is changed according to a viewing state, and so on. When frame-by-frame playback of a video is done during viewing the video and data at a playback start position of a target video is still not buffered in the client, the video data must be newly downloaded from the origin server. As a result, re-buffering occurs.

Furthermore, when a network state is changed (improved or deteriorated) and image quality of a video is changed by ABR, it is necessary for a client to newly download video data. As a result, re-buffering occurs. In a client, what causes re-buffering is also called a "re-buffering event".

As illustrated in FIG. 2, after entering a steady phase, a client side may enter a buffering phase again (re-buffering) due to an occurrence of a re-buffering event on the client side.

Recently, with increase in video traffic, a related technology is known, which performs traffic optimization processing for controlling data transmission bit rate in a data relay apparatus arranged between a client and an origin server in order to reduce a communication band range by suppressing wasteful traffic.

Furthermore, as traffic optimization, traffic optimization for video communication by ABR is also known. For example, a data relay apparatus, by controlling a transmission bitrate of an ABR video (a video delivered by ABR is also called an "ABR video") transmitted to a client side, by an ABR mechanism, performs selection of an image quality adapted to a transmission bitrate. As a result, the image quality of a video to be delivered from an origin server to a client is changed.

The higher an image quality of a video, the larger a data amount of the video, while the lower the image quality of a video, the smaller the data amount of the video. By controlling a bitrate of transmission of a video, an image quality is controlled and a data amount of an ABR video flowing on a network is controlled (FIG. 3). FIG. 3 is a diagram illustrating traffic optimization of an ABR video by a data relay apparatus 20.

A client 10 transmits a video request (an HTTP request in which an image quality, a segment and so forth are specified) to a data relay apparatus 20 (S1).

The data relay apparatus 20, on reception of the video request from the client 10, forwards the video request from the client 10 to an origin server 30 (S2).

The origin server 30 transmits a video specified by the video request, as a response to the request from the client 10 (S3). For example, when a network between the client 10 and the origin server 30 is congested (decrease of a network communication speed), a transmission bitrate of data transmitted from the data relay apparatus 20 to the client 10 is decreased, by an ABR mechanism, the client 10 is caused to select a video with a low image quality. As a result, an amount of data of a video delivered from the origin server 30 is decreased to alleviate congestion of the network.

Controlling transmission bitrate of data transmitted from the data relay apparatus 20 to the client 10 is also called as pacing, shaping, or throttling.

The data relay apparatus 20 controls the transmission bitrate by the pacing (S4).

The client 10 transmits a video request in which a lower image quality is specified in accordance with the transmission bitrate of S4 (S5).

The data relay apparatus 20 forwards the video (the lower image quality) request from the client 10 to the origin server 30 (S6).

The origin server 30 transmits, as a response to the video request from the client 10, a video with a lower image quality specified in the request (S7).

The data relay apparatus 20 transmits to the client 10 the video with the lower image quality transmitted from the origin server 30 (S8).

It is noted that if pacing is applied in a buffering phase, a start of playback of a video is delayed because it takes time for data sufficient to start viewing the video to be accumulated in the client 10. As a result, a quality: QoE (Quality of Experience) experienced by a user on the client 10 side may be deteriorated.

To prevent QoE from being deteriorated due to a delay of start of playback of a video, there is also a data relay apparatus 20 which transmits a little extra amount of data in a bursty way during a predetermined period at a start of communication or during a certain amount of data, according to change of a delivery phase of ABR, and thereafter, performs the pacing. FIG. 4A is a diagram schematically illustrating temporal transition of a transmission bitrate of pacing to the client 10 by the data relay apparatus 20 and which corresponds to an example of data communication from the data relay apparatus 20 to the client 10 of FIG. 3. In FIG. 4A, a horizontal axis is time and a vertical axis is a data amount.

In an example as illustrated in FIG. 4A, after the data relay apparatus 20 has transmitted a video data in a bursty way to the client 10 in accordance with an ABR buffering phase, it controls a transmission bitrate of data transmitted from the data relay apparatus 20 to the client 10 according to a steady phase.

As to the pacing described above, PTL 1 describes a problem that a commonly provided pacing delivery method is a method for performing pacing when one file which is not divided is delivered as single content, and because there is no mechanism to regard a divided segment file as a part of single content, pacing is not performed for a whole content. PTL 1 discloses a relay apparatus between a content delivery server apparatus and a client apparatus, which relay apparatus enables to distribute contents by an ABR delivery scheme which can perform pacing delivery according to a delay state of a network and an operation state of the client apparatus. This relay apparatus includes a delivery speed calculation part which calculates an actual delivery speed of divided files delivered in sequence according to playback of a content, wherein the divided files are obtained by dividing file data of the content to be delivered, and a delivery speed determination part which determines a delivery speed of the dived files, based on the actual delivery speed calculated by the delivery speed calculation part, a predetermined assumed delivery speed, and a threshold value relating to a predetermined reception interval of the divided files.

Furthermore, as a technology related to transmission rate control, for example, PTL 2 discloses a configuration to control a transmission rate of a re-transmission packet in such a manner that transmission data of a normal packet and a re-transmission packet do not exceed an available band width (usable band width) based on information of a re-transmission request when re-transmission occurs during data delivery by RTP (Realtime Transport Protocol).

PTL 3 describes a problem that, when data is encrypted, because a transmission apparatus which has received the data cannot grasp a type of data content, which becomes an obstacle to improvement of QoE. PTL 3 discloses a data transmission apparatus which overcomes the problem, that is, a data transmission apparatus to improve QoE even when data is encrypted. This data transmission apparatus includes a reception part which receives encrypted data, a transmission part which transmits the received data by the reception part, and a control part which control a speed for transmitting data by the transmission part, wherein the control part determines whether or not it is a first transmission of a series of data, for every series of data received by the reception part, wherein when it is determined to be the first transmission, the control part causes the transmission part to transmit data which is to be the first transmission in the series of data by excluding it from a target of transmission speed restriction. When data amount received by the reception part satisfies a predetermined condition, the control part changes a mode from a speed restriction mode in which the data transmission speed of the transmission part is restricted to a non-speed-restriction mode in which the data transmission speed of the transmission part is not restricted.

PTL1: Japanese Unexamined Patent Application Publication No.JP-P2016-219915A PTL 2: WO2014/010171A1 PTL3: Japanese Unexamined Patent Application Publication No.JP-P2016-100681A NPL 1: QUIC A New Internet Transport Presenter: Jana Iyengar, [searched on Dec. 25, 2018], internet (URL:ietf.org/proceedings/96/slides/slides-96-quic-5.pdf)

SUMMARY

Analysis of the related art will be provided as below.

In ABR video delivery, in order to avoid deterioration of QoE and optimize a traffic, it is necessary for a data relay apparatus to determine in which phase an ABR video is delivered.

However, it is difficult for a data relay apparatus to detect occurrence of re-buffering. The reason is as below.

In recent years, video traffic is often encrypted by, for example, TLS (Transport Layer Security), etc. In this case, the data relay apparatus 20 cannot refer to content of data (metadata such as header information, and video data).

In TLS, although an IP (Internet Protocol) header and a TCP (Transmission Control Protocol) header are not encrypted, a TCP payload is encrypted. Thus, an HTTP message arranged in a TCP payload is encrypted. In an HTTP request, a start line (made up by an HTTP method (GET, POST, and so on), a request target, and an HTTP version), a header (information as to the request and an attribute(s) (including a request URL (Uniform Resource Locator)), and a body (in a case of GET, there is no body) are encrypted. In an HTTP response, a start line (status line), a header, and a body (for example, video data from a server, etc.) are encrypted.

With respect to an HTTP request packet transmitted from a client 10 to an origin server 30, what a data relay apparatus 20 can grasp are a destination IP address and a transmission source IP address in an IP header, a destination port number and a transmission source port number in a TCP header, as well as a packet data size and a data flow rate (bitrate).

In a data relay apparatus 20, it is difficult to detect a re-buffering event on a client 10 side from these limited pieces of information.

FIG. 4B and FIG. 4C are diagrams illustrating temporal transition of a transmission bitrate from a data relay apparatus 20 to a client 10 at the time of pacing.

When a data relay apparatus 20 cannot detect re-buffering and continues pacing, in spite of a buffering phase, QoE will be deteriorated on a client 10 (FIG. 4B).

In order to prevent deterioration of QoE on a client 10 side, it is necessary for a data relay apparatus 20 to detect a re-buffering event and to transmit data in a bursty way to a client 10 in accordance with a buffering phase due to re-buffering (FIG. 4C).

The present invention is invented in view of the above and it is an object of the present invention to provide a data relay apparatus, a method, a delivery system, and a non-transitory medium storing a program, each enabling, in a data relay apparatus arranged between a client apparatus and a server apparatus delivering content, to detect occurrence of re-buffering and optimize traffic.

According to an aspect of the present invention, there is provided a data relay apparatus arranged between a client apparatus and a server apparatus which delivers content, including: a first means which receives a packet which is transmitted from the client apparatus to the server apparatus and discriminates the packet, based on a data size thereof; and a second means which detects re-buffering, based on a frequency of transmission of a predetermined packet discriminated.

According to another aspect of the present invention, there is provided a data relay method including: discriminating a packet, based on a data size thereof, the packet transmitted from a client apparatus to a server apparatus which delivers content; and detecting re-buffering, based on a transmission of transmission of a predetermined packet discriminated.

According to another aspect of the present invention, there is provided a delivery system, including: the data relay apparatus of the first aspect described above, a server apparatus which delivers content; and a client apparatus.

According to another aspect of the present invention, there is provided a program that causes a computer to execute processing, including: discriminating a packet based on a data size thereof, the packet transmitted from a client apparatus to a server apparatus which delivers content; and detecting re-buffering, based on a frequency of transmission of a predetermined packet discriminated. According to the present invention, there is provided a computer-readable storage medium on which the above program is recorded (for example, semiconductor storage, such as RAM (Random Access Memory), ROM (Read Only Memory), or EEPROM (Electrically Erasable and programable ROM) and so on, and non-transitory computer readable recording medium, such as HDD (Hard Disk Drive), CD (Compact Disk), DVD (Digital Versatile Disk), and so on).

The present invention enables a data relay apparatus between a client apparatus and a server apparatus which delivers content, to detect occurrence of re-buffering and optimize traffic.

BRIEF DESCRIPTION OF DRAWINGS

FIG. 3 is a diagram illustrating traffic optimization of an ABR video by a data relay apparatus.

DETAILED DESCRIPTION

Example embodiments of the present invention will be described. In an example embodiment of the present invention, a client (e.g., a mobile apparatus) is an apparatus which requests transmission of data (including a video, etc.) from an origin server, and as a result, receives data transmitted from the origin server. As a specific example, the client may be at least any one of a mobile phone including a smart phone, a tablet terminal, a personal computer, a TV (Television) with a network connection function, and so on.

The origin server is made up by, for example, a video delivery site and is an apparatus which transmits data including a video according to a request from a client. It is noted that as previously described, a video is divided into segments, each of which is a video in a unit of a few seconds and is held as segments. The client performs video playback while acquiring a video in a unit of a segment.

A data relay apparatus is an apparatus which relays communication between a client and an origin server and applies a traffic optimization processing.

A data relay apparatus is configured to detect a buffering phase (re-buffering) during delivery of a video by ABR.

Furthermore, the data relay apparatus, after detecting the buffering phase, performs a transmission bitrate control by traffic optimization of an ABR video.

According to an example embodiment of the present invention, the data relay apparatus is configured to detect re-buffering by analyzing a data size of upload packet data from the client to the origin server and a transmission interval. That is, the data relay apparatus is configured to identify a request packet, based on a size of packet data from the client to the origin server, and detect re-buffering, based on a transmission frequency of the request packet.

According to the example embodiment of the present invention, even if an ABR video is encrypted, since determination of re-buffering is performed based on information available in a data relay apparatus (a packet data size, a packet reception interval), the detection of re-buffering is effective regardless of whether an ABR video is encrypted/unencrypted.

Furthermore, in a data relay apparatus, the detection of re-buffering is effective, regardless of whether a communication of TCP (Transmission Control Protocol)/UDP (User Datagram Protocol) is terminated/not terminated.

Figure 1:
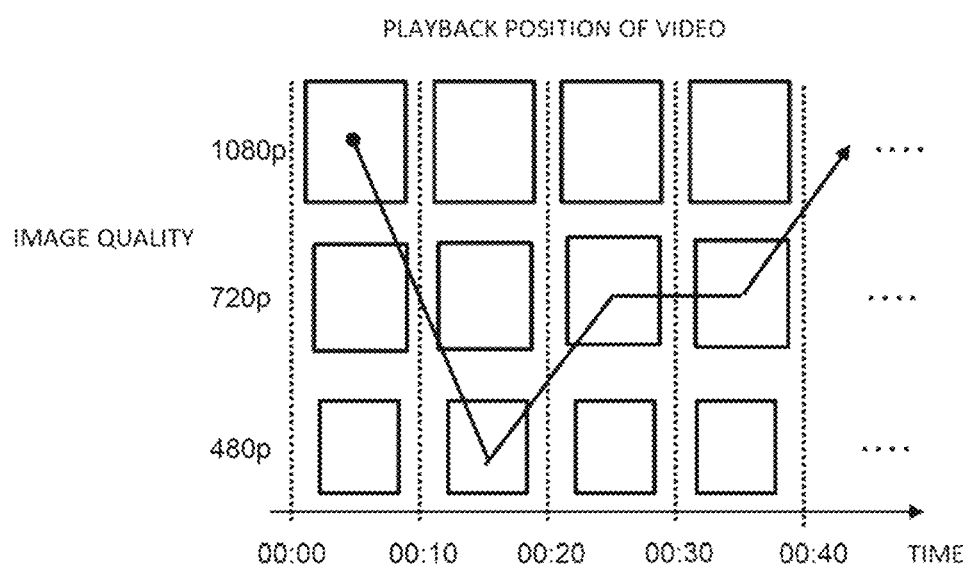
FIG. 1 is a diagram illustrating a dynamic change of image quality by ABR.
Figure 2:
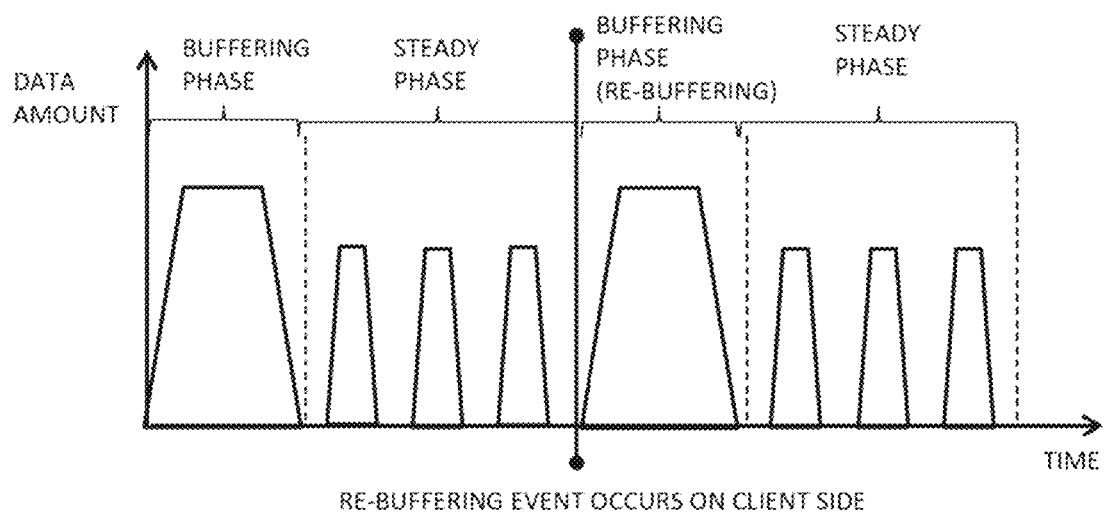
FIG. 2 is a diagram schematically illustrating an example of a time series variation in a received data amount per unit time from an origin server.
Figure 4A:
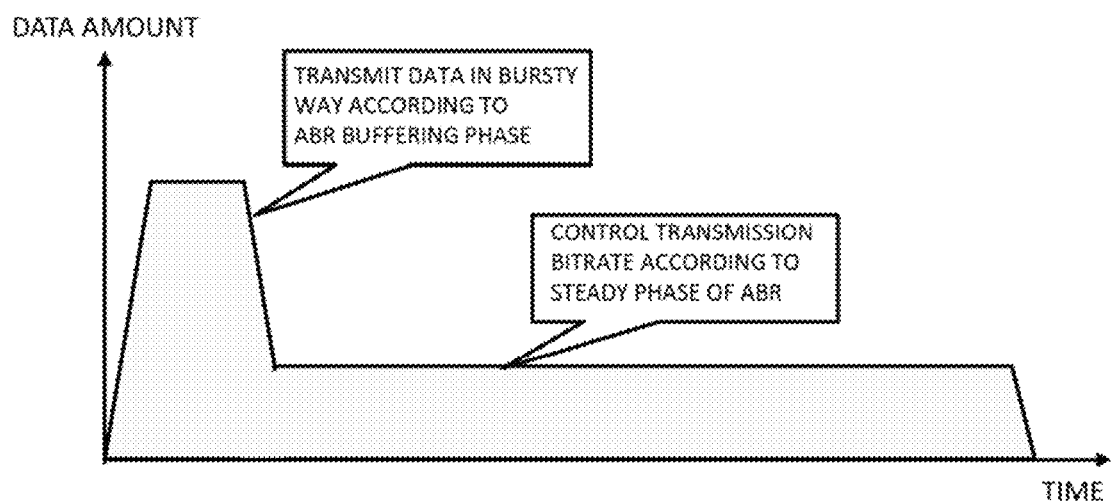
FIG. 4A is a (first) diagram illustrating a transmission bitrate at a time of pacing from a data relay apparatus to a client.
Figure 4B:
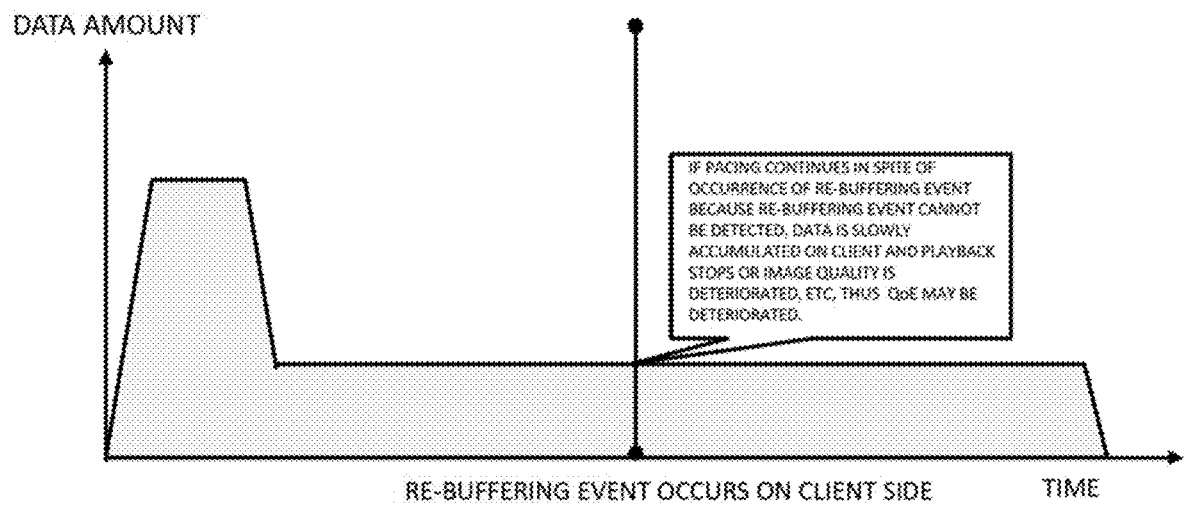
FIG. 4B is a (second) diagram illustrating the transmission bitrate at a time of pacing from the data relay apparatus to the client.
Figure 4C:
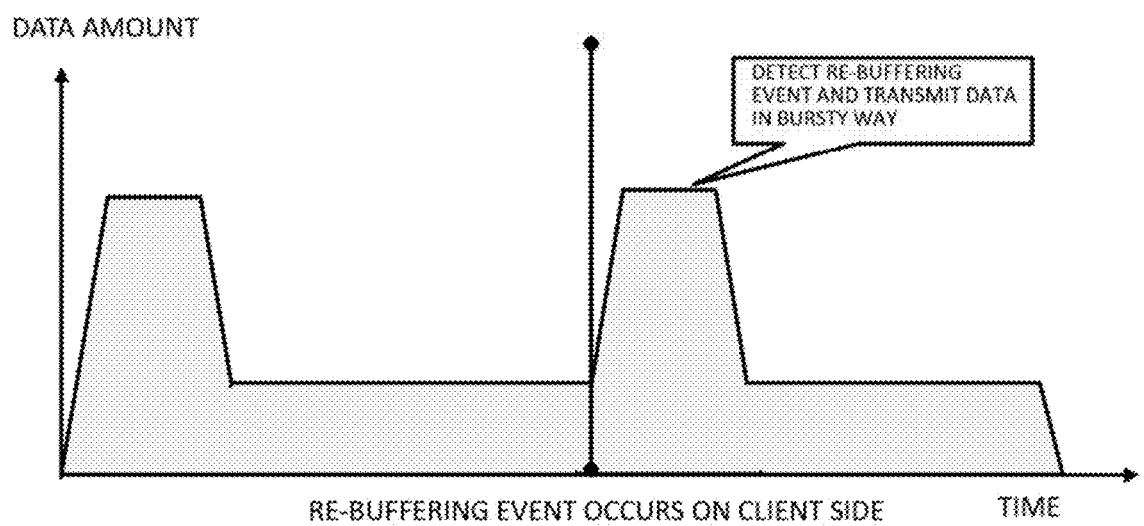
FIG. 4C is a (third) diagram illustrating the transmission bitrate at a time of pacing from the data relay apparatus to the client.
Figure 5A:
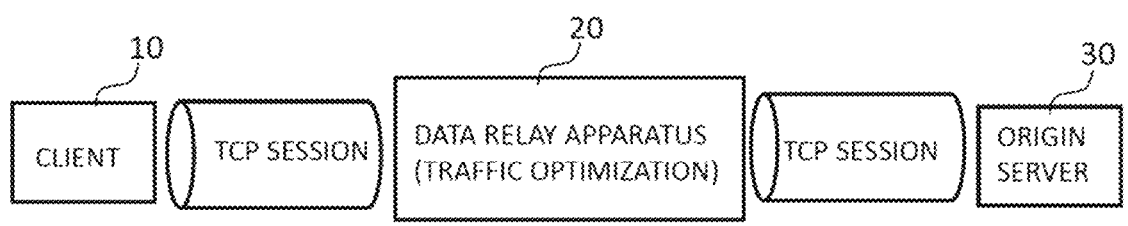
FIG. 5A is a diagram illustrating termination of TCP by a data relay apparatus.

FIG. 5A is a diagram illustrating TCP termination at a data relay apparatus 20. Communication between a client 10 and a data relay apparatus 20 and communication between the data relay apparatus 20 and an origin server 30 are performed in separate TCP sessions. That is, in a case where TCP is terminated at the data relay apparatus 20, the data relay apparatus 20 generates TCP sessions respectively for communicating the client 10 and the origin server 30. It is noted that to establish a TCP session, for example, a TCP synchronization request (SYN) packet is transmitted from the client to the data relay apparatus 20, a synchronization request+an acknowledge (SYN+ACK) packet is returned from the data relay apparatus 20, and an acknowledge (ACK) packet is transmitted from the client 10 to the data relay apparatus 20. The data relay apparatus 20 then transmits a TCP synchronization request (SYN) packet to the origin server 30, a synchronization request+an acknowledge (SYN+ACK) packet is returned from the origin server 30, and an acknowledge (ACK) packet is transmitted from the data relay apparatus 20 to the origin server 30.

Figure 5B:
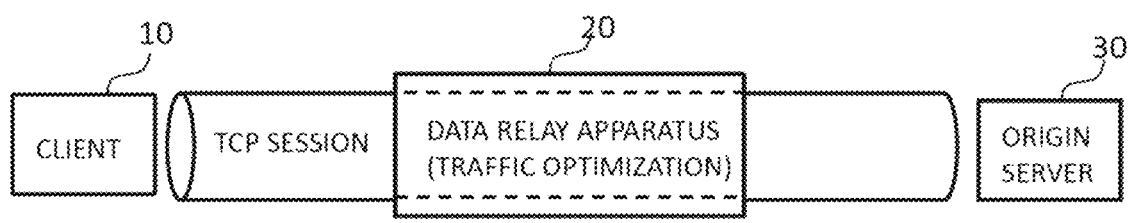
FIG. 5B is a diagram illustrating non-termination of TCP by a data relay apparatus.

In a case where TCP is not terminated at the data relay apparatus 20, the client 10 exchanges data through a TCP session with the origin server 30 and the data relay apparatus 20 forwards the data (FIG. 5B). That is, the client 10 and origin server 30 directly communicate each other through one TCP session and the data relay apparatus 20 forwards data.

Upload packet data transmitted from the client 10 to the origin server 30 during viewing an ABR video is broadly divided into two types as below.

a video request data from the client 10, and an acknowledge (ACK packet) when data is received.

Figure 6:
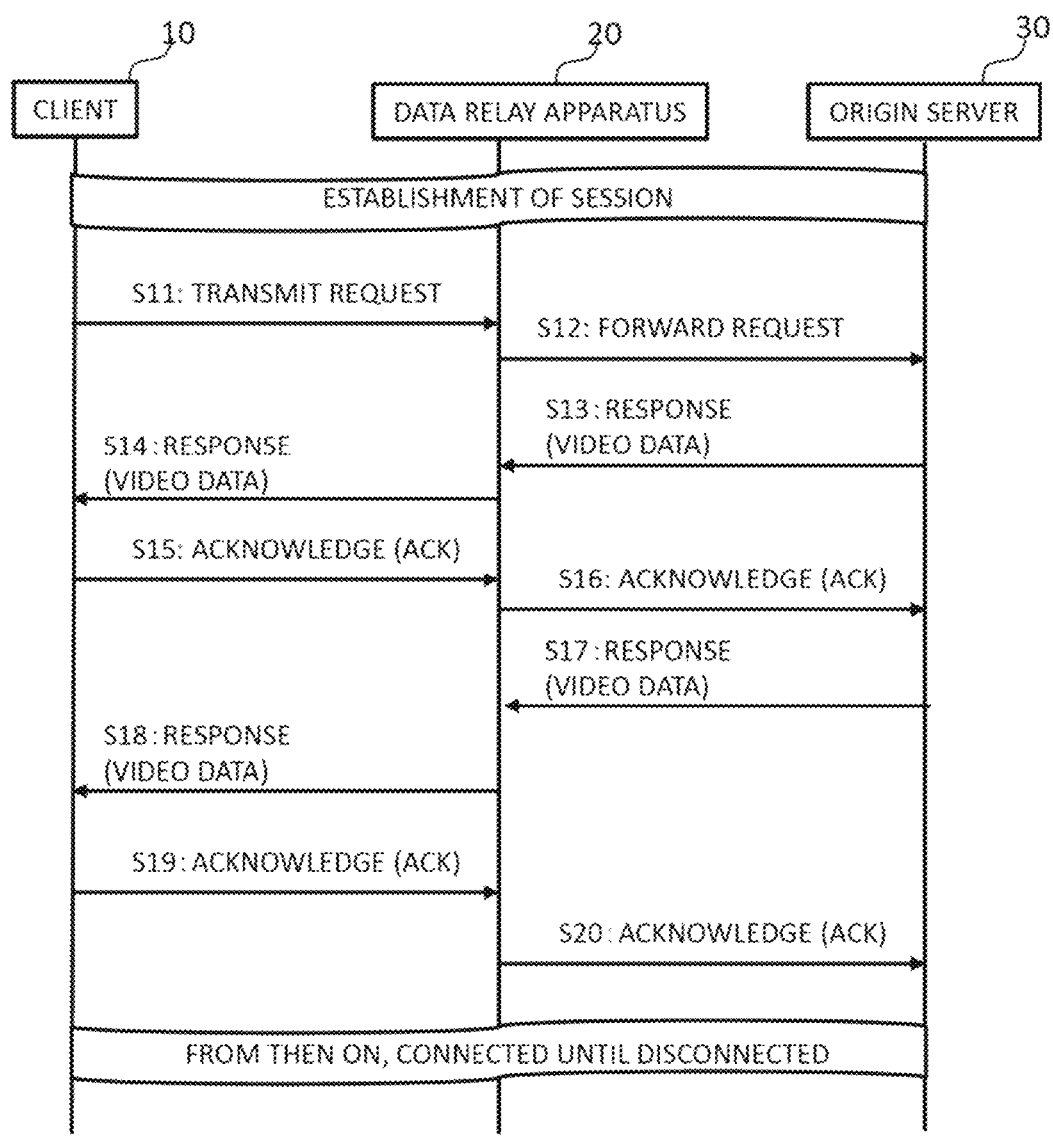
FIG. 6 is a diagram illustrating a sequence of data transmission and reception.

FIG. 6 is a diagram illustrating a sequence of data transmission and reception. In data transmission and reception between the client 10 and the origin server 30, in general, the client 10 transmits a request (HTTP request) of data (video data) to be received to the origin server 30 (S11).

The data relay apparatus 20 forwards the request (HTTP request) of data (video data) from the client 10 to the origin server 30 (S12).

The origin server 30 which has received the request through the data relay apparatus 20 transmits the requested video data to the client 10 as a response (HTTP response) to the request from the client 10 (S13).

The data relay apparatus 20 forwards the video data from the origin server 30 to the client 10 (S14).

When the client 10 receives the video data from the origin server 30, it transmits an ACK packet which is an acknowledge response to the origin server 30 to notify the origin server 30 of reception of the video data (S15).

The data relay apparatus 20 forwards the ACK packet to the origin server 30 (S16). After step S16, transmission of the video data from the origin server 30 to the client 10 and transmission of the ACK packet from the client 10 which has received a video data to the origin server 30 are performed (S17-S20). Please note that, although FIG. 6 illustrates a sequence in a case where TCP is not terminated at the data relay apparatus 20, reception of a response (video data) and transmission of an ACK packet which is a response thereto are performed in each session if the TCP is terminated at the data relay apparatus 20. That is, when a response (video data) to a request from the client 10 is received from the origin server 30 (S13 in FIG. 6), the data relay apparatus 20 transmits an ACK packet which is an acknowledge to the origin server 30 (S16 in FIG. 6). Subsequently, the data relay apparatus 20 transmits the response (video data) to the client 10 (S14 in FIG. 6), and the client 10 which has received the response (video data) transmits an ACK packet which is an acknowledge to the data relay apparatus 20 (S15 in FIG. 6). Thereafter, transmission of a response (video data) from the origin server 30 to the data relay apparatus 20 (S17 in FIG. 6), transmission of an ACK packet from the data relay apparatus 20 to the origin server 30 (S20 in FIG. 6), transmission of the response (video data) from the data relay apparatus 20 to the client 10 (S18 in FIG. 6), and transmission of an ACK packet from the client 10 to the data relay apparatus 20 (S19 in FIG. 6) are performed. That is, in a case where TCP is terminated at the data relay apparatus 20, its sequence in FIG. 6 becomes as follows: S13 immediately followed by S16, subsequently followed by S14 and S15, and S17 immediately followed by S20, subsequently followed by S18 and S19.

The origin server 30 confirms that data has been transmitted to the client 10 by receiving an ACK packet from the client 10 through the data relay apparatus 20. This is an operation to ensure reliability of TCP communication. The same applies to QUIC (Quick UDP Internet Connections) traffic operating on an UDP (User Datagram Protocol)/IP (Internet Protocol) stack, which has been increasing in recent years, as well as communication by TCP/IP (Internet Protocol).

Figure 7:
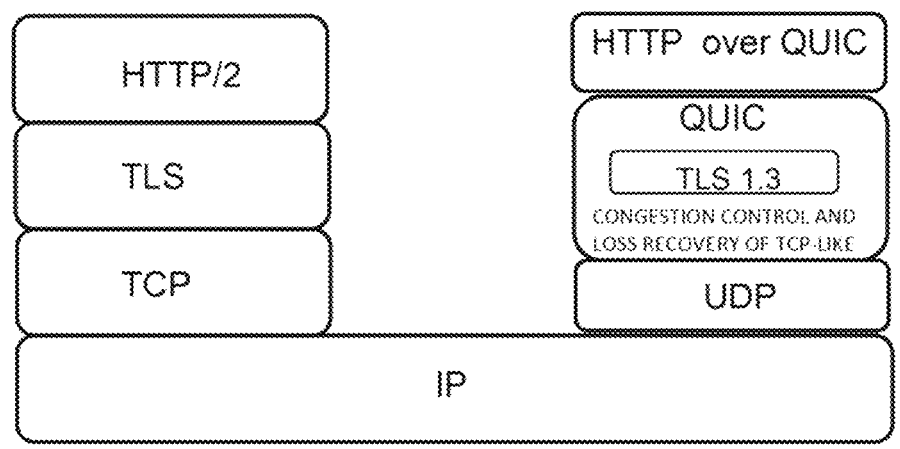
FIG. 7 is a diagram illustrating a protocol stack for ABR video.

FIG. 7 is a diagram exemplifying a protocol stack of an ABR video (cited from The IETF (The Internet Engineering Task Force) Proposal in NPL (Non-Patent Literature) 1). A left side of FIG. 7 is an HTTP/2 over TSL/TCP protocol stack. TCP is a connection type protocol of high reliability which includes window control, retransmission control, and congestion control. A right side is an HTTP/2 over QUIC protocol stack. QUIC tries to improve a problem regarding the number of round trips required for TCP connection establishment handshake and waiting of a plurality of requests in recovery from packet loss. QUIC uses UDP. Although UDP is a connectionless type protocol and has no mechanism to ensure reliability such as retransmission control, processing thereof is simple and low delay. QUIC provides functions of congestion control, retransmission control, loss recovery, and so on corresponding to functions of TCP to ensure reliability of communication and a reception response (acknowledge) packet (ACK packet) is transmitted in the same way as TCP. Furthermore, QUIC provides stream control, flow control and so on, which are a part of HTTP/2 functions. For negotiation and key exchange of a cryptographic scheme, for example, a security function of TLS 1.3 is used.

In typical standards of ABR (HLS, MPEG-DASH, and so on), acquisition and delivery of a video are controlled by an HTTP protocol. A packet data size of an HTTP request packet by ABR is relatively large. A packet size of an acknowledge packet (ACK) in TCP and QUIC protocols is smaller than that of an HTTP request. Hence, it is possible to distinguish between an HTTP request packet (abbreviated as "request packet") and an ACK packet by a packet size thereof.

In the case of an ABR video, a request packet includes information of image quality and a playback start position of video data to be acquired, and a packet data size of the request packet is at least several hundred bytes or more. On the other hand, an ACK packet is sufficiently smaller than the request packet (e.g., about 100 bytes).

In a data relay apparatus 20, it is possible to determine whether a packet is a request packet or an ACK packet by a packet data size, even when the packet is encrypted (the same applies to a case where it is not encrypted). Furthermore, it is possible to determine a buffering mode by a frequency (transmission interval) of the request packet transmitted from a client 10 to an origin server 30.

In a buffering phase, more request packets are transmitted from a client 10 than in a steady phase. Because a video is divided in ABR, it is necessary to increase the number of requests from a client 10 side in order to receive data from the origin server 30 in a burst manner, for hastening start of playback.

Furthermore, there is a video site from which a client 10 acquires pieces of video data of a plurality of image qualities until appropriate image quality is determined.

According to the above reason, an occurrence frequency of a request packet in a buffering phase becomes higher than that in a steady phase.

Figure 8A:
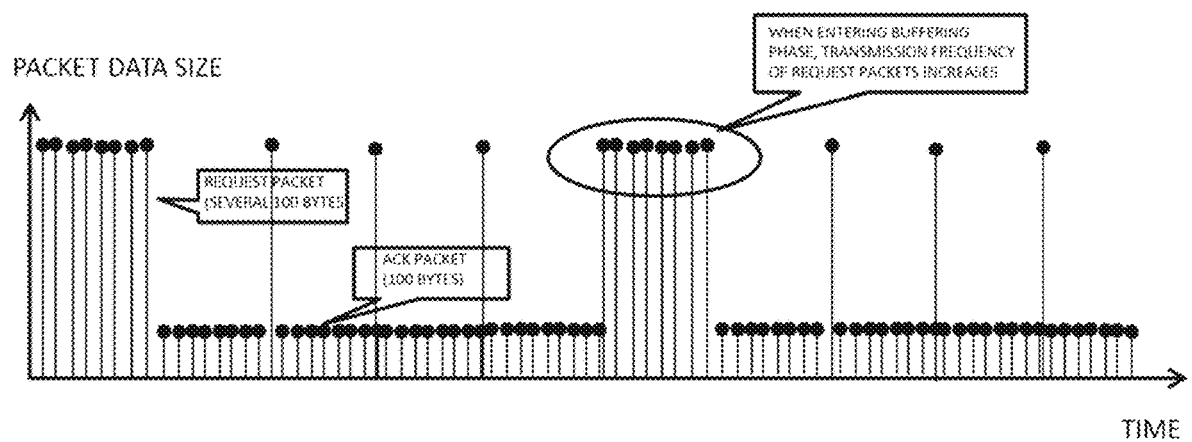
FIG. 8A is a diagram illustrating relationship between transmission data from a client and transmission data from an origin server.
Figure 8B:
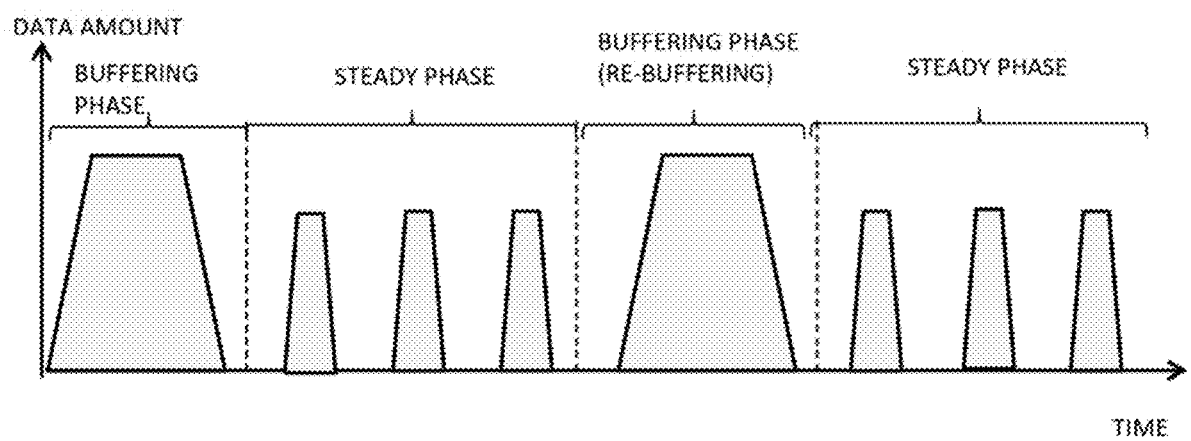
FIG. 8B is a diagram illustrating a time series variation of response data transmitted from an origin server.

FIG. 8A and FIG. 8B are diagrams illustrating relationship between transmission data from a client and transmission data from an origin server. A time axis of a horizontal axis is common in FIG. 8A and FIG. 8B.

FIG. 8A is a diagram illustrating a time series variation of request packets from a client 10. A request packet has about several hundred bytes and an ACK packet has about a hundred bytes. When entering a buffering phase, a transmission frequency of a request packet increases.

FIG. 8B is a diagram schematically illustrating a bitrate of response data from an origin server with respect to a request packet from a client 10.

Figure 9:
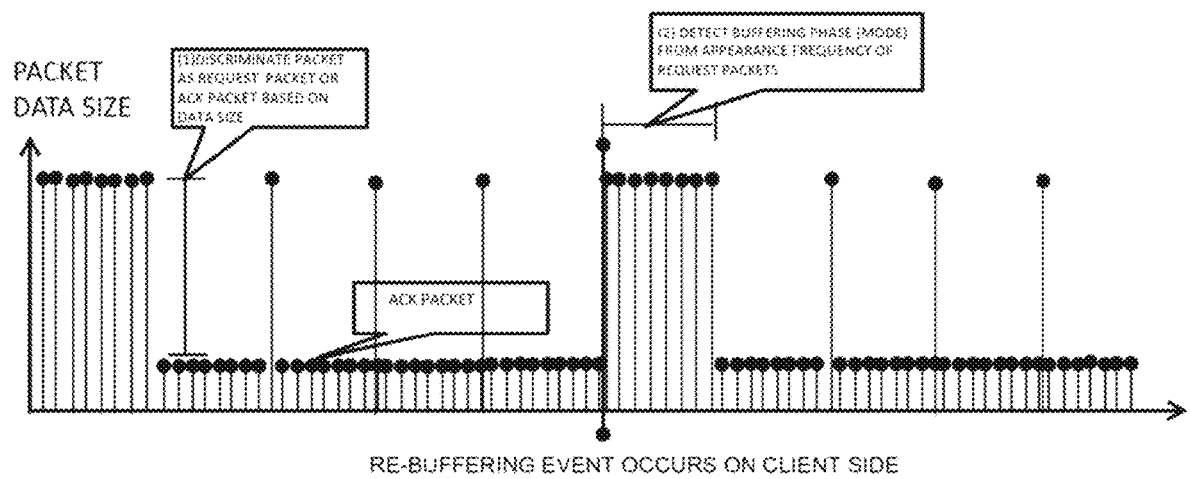
FIG. 9 is a diagram illustrating a detection method of a buffering phase.

FIG. 9 is a diagram illustrating a detection method of a buffering phase in a data relay apparatus 20. Referring to FIG. 9, (1) based on a data size of a packet uploaded from a client 10, the data relay apparatus 20 discriminates whether it is a request packet or an ACK packet.

(2) The data relay apparatus 20 detects a buffering mode, that is, occurrence of a rebuffering event on a side of the client 10, based on increase of an appearance frequency (increase of the number of transmissions per unit time: reduction of a transmission interval) of a request packet transmitted from the client 10 to an origin server 30.

Figure 10:
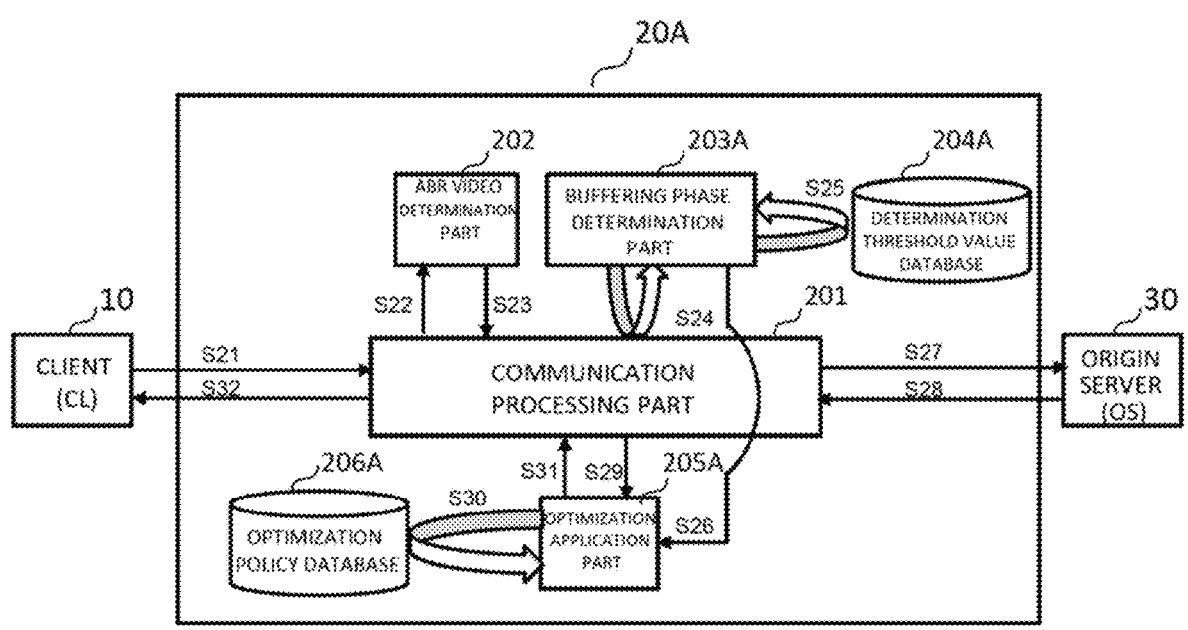
FIG. 10 is a diagram illustrating a configuration example of a data relay apparatus according to an example embodiment of the present invention.

FIG. 10 is a diagram schematically illustrating a configuration of a data relay apparatus 20A according to an example embodiment of the present invention. In FIG. 10, arrow lines between each of units illustrates an example of data transmission and it does not as a matter of course mean that data and control signals between each of units are limited to in the direction of arrow lines. Reference signs attached to arrow lines correspond to steps illustrated in FIG. 11 as described later.

A communication processing part 201 is an application which is in charge of relaying data in the data relay apparatus 20A. If TCP is terminated, it corresponds to an application which operates as a proxy (proxy server) for the origin server 30.

An ABR video determination part 202, from uploaded data from the client 10 or response data from the origin server 30, determines whether the communication is an ABR video. The determination is made from header information such as an IP address or communication information such as data size, and so on.

A buffering phase determination part 203A monitors packets transmitted form the client 10 to the origin server 30 and discriminates a buffering phase from a packet data size and a packet transmission frequency.

The buffering phase determination part 203A monitors communication in which a response from the origin server 30 has been discriminated as an ABR video by the ABR video determination part 202.

Because a packet data size and a transmission frequency from the client 10 when entering a buffering phase differ for each of origin servers 30, the buffering phase determination part 203A issues an inquiry to a determination threshold value database 204A.

When the buffering phase determination part 203A detects a buffering phase, the buffering phase determination part 203A notifies an optimization application part 205A.

On reception of a notification from the buffering phase determination part 203A, the optimization application part 205A performs an optimization processing to be applied to the buffering phase.

When entering a buffering phase, a packet data size and a transmission frequency from the client 10 differ for each of origin servers 30. Therefore, the determination threshold value database 204A retains (stores and holds a plurality of threshold values for detecting a buffering phase for each of origin servers 30.

The determination threshold value database 204A returns a threshold value of a packet data size and a transmission frequency when the origin server 30 enters a buffering phase, in response to an inquiry from the buffering phase determination part 203A.

The optimization application part 205A receives response data of the origin server 30 from the communication processing part 201 and performs traffic optimization processing, such as transmission bitrate control and so on. On reception of a notification of detection of a buffering phase from the buffering phase determination part 203A, the optimization application part 205A carries out optimization processing to be applied to the buffering phase.

An optimization policy database 206A, in response to receiving an inquiry including information on communication (IP addresses of a client and an origin server, and so on) from the optimization application part 205A, determines an optimization policy for the communication and returns to the optimization application part 205A.

Regarding a network(s),
(1) the client 10 and the data relay apparatus 20A are connected and
(2) the data relay apparatus 20A and the origin server 30 are connected, by different networks, respectively.

Typically, although (1) is a wireless network and (2) is a wired network, other combinations may be used. When the client 10 and the data relay apparatus 20A are connected by a wireless network, the data relay apparatus 20A may be configured to be mounted in a wireless base station or a wireless access point. Alternatively, the data relay apparatus 20A may be mounted in a core network node connected to a wireless base station or an MEC (Mobile Edge Computing) server and so on.

Figure 11:
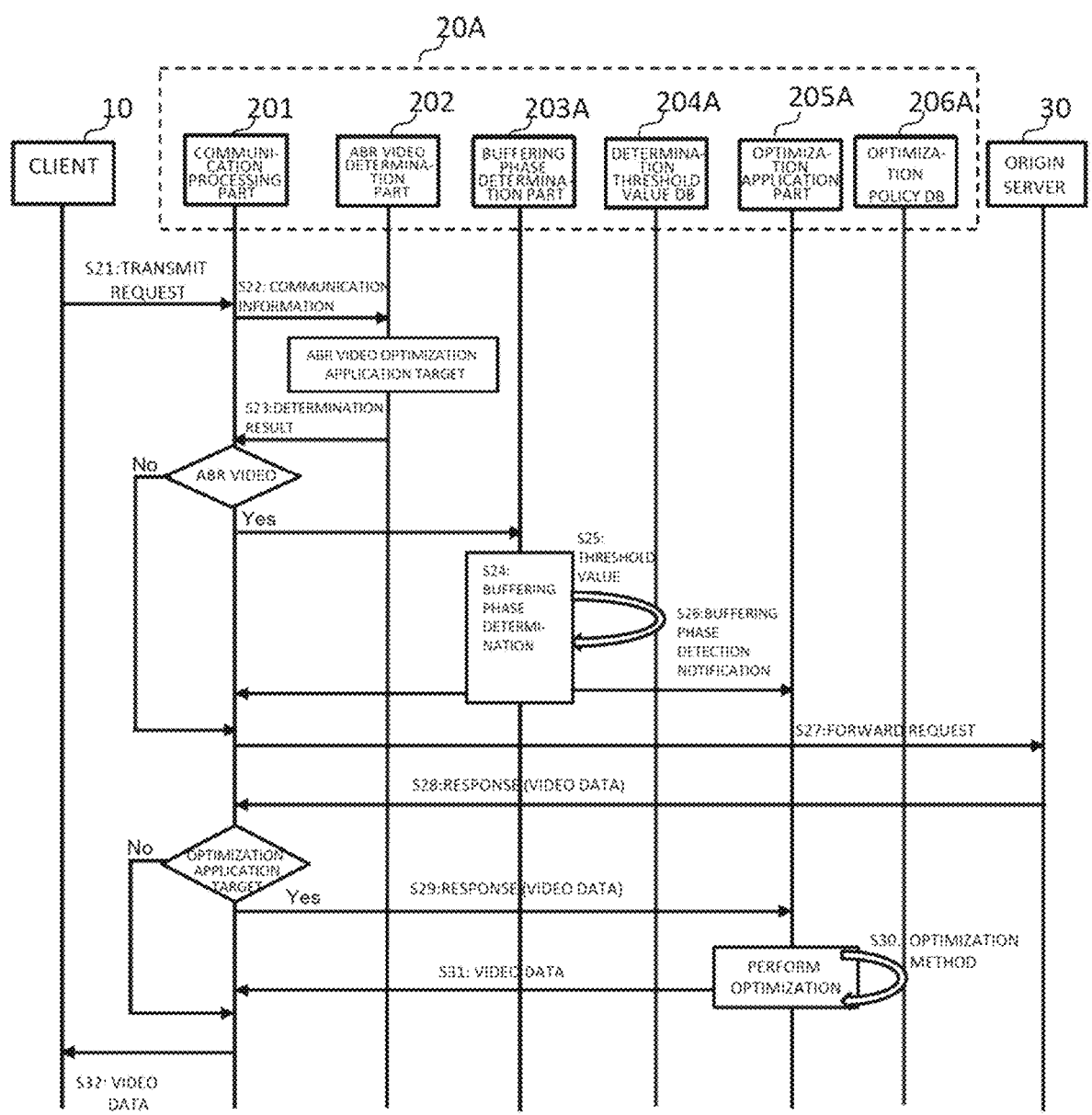
FIG. 11 is a diagram illustrating an operation example of a data relay apparatus.

FIG. 11 is a diagram illustrating an operation of a data relay apparatus 20A as illustrated in FIG. 10. A communication processing part 201 receives an HTTP request packet for content delivery (encrypted by TLS and so on) from the client 10 (step S21).

The communication processing part 201 provides communication information to the ABR video determination part 202 (step S22). As described above, an HTTP request message (a start line, a header and a body) is encrypted, and in the communication processing part 201 of the data relay apparatus 20A, a destination IP address and a source IP address of an IP header in the HTTP request packet, and a destination port number and a source port number of a TCP header (UDP header) may be supplied to the ABR video determination part 202. The ABR video determination part 202 determines from the information on communication received from the communication processing part 201, whether or not the communication is an ABR video. The ABR video determination part 202 may determine whether or not the communication is an ABR video delivery, for example, by acquiring URL of a request target by reverse DNS (Domain Name System) lookup from the destination IP address and identifying that a destination of the HTTP request packet is an origin server (Web server).

Furthermore, the ABR video determination part 202 determines, at the same time, whether or not the communication is a target to which ABR video traffic optimization is performed. In the ABR video determination part 202, when the communication is delivery of the ABR video, a response (video data) transmitted from the origin server 30 to client 10 may be set as a target of traffic optimization.

The ABR video determination part 202 may perform discrimination in the same way, when receiving not only upload data from the client 10 but also an HTTP response (a video is arranged in a body) from the origin server 30. An HTTP response is encrypted. In the data relay apparatus 20A, a transmission source IP address and a destination IP address in an IP header of an HTTP response packet, and a source port number and a destination port number of a TCP header (UDP header) may be passed to the ABR video determination part 202. The ABR video determination part 202 may determine whether or not the communication is an ABR video delivery, for example, by acquiring URL of a source by reverse DNS (Domain Name System) lookup from the source IP address of the HTTP response packet transmitted from the origin server 30 to the client 10 and identifying that it is the origin server (Web server) of the packet.

Alternatively, as another method, information of TLS handshake performed when communication with TLS is performed, may be used, as the information on communication. The TLS handshake is transmitted by a plain text before being encrypted in TLS communication. There are domain information of SNI (Server Name Indication) included in ClientHello (TLS extension) by which a client notifies a server of start of communication and domain information of a common name indicating URL of a site included in a certificate transmitted from a server to a client, the ABR video determination part 202 may determine whether or not the communication is an ABR video, based on information (information set in advance) that a site corresponding to the domain is delivering a video by ABR.

The ABR video determination part 202 returns a result of determination as to whether or not the communication is an ABR video to the communication processing part 201 (step S23).

When the ABR video determination part 202 determines that the communication is an ABR video, the communication processing part 201 causes the buffering phase determination part 203 to operate. The buffering phase determination part 203 monitors upload data from the client 10. At the time, the buffering phase determination part 203A issues an inquiry to the determination threshold value database 204 and acquires threshold values of a packet data size and a transmission frequency when the origin server 30 enters a buffering phase (S24). When a result of determination by the ABR video determination part 202 is not an ABR video, the communication processing part 201 transfers a request from the client 10 to the origin server 30.

The buffering phase determination part 203A determines to be in a buffering phase when packet data size and a transmission frequency exceeds the threshold values acquired from the determination threshold value database 204.

If it is determined to be in a buffering phase, the buffering phase determination part 203A notifies the communication processing part 201 and the optimization application part 205A as well of detection of a buffering phase (S26).

The communication processing part 201 transmits a content delivery request received from the client 10 to the origin server 30 (S27).

The communication processing part 201 receives response data from the origin server 30 (S28) in response to receiving the request of the client 10.

In a case that the ABR video determination part 202 has determined that the video data from the origin server 30 is a target to which an optimization processing is performed, the communication processing part 201 transmits video data to the optimization application part 205A (S29).

The optimization application part 205A issues an inquiry to the optimization policy database 206A, as to how the optimization is performed to (optimization method) the communication concerned (S30). The optimization policy database 206A determines the optimization method and returns it to the optimization application part 205A (S30).

Transmission bitrate for an ABR video is also determined by the optimization policy database 206A. The optimization policy database 206A may be configured to register and retain an optimization method of ABR video transmission (e.g., transmission bitrate) which is associated with each user (telecommunication career and ISP (Internet Service Provider) and so on) who uses the data relay apparatus 20.

The optimization application part 205A performs optimization of the video data of the response from the origin server 30 using a determined optimization policy and transmits the optimized video data to the communication processing part 201 (S31).

The communication processing part 201 transmits the video data received from the optimization application part 205A to the client 10 (S32). When the video data from the origin server 30 is not an optimization target, the communication processing part 201 does not transmit video data from the origin server 30 to the optimization application part 205A but transmits the video data to the client 10 as it is. In the ABR video determination part 202A, with respect to a video, the data relay apparatus 20 may hold in advance setting information as to whether or not optimization is performed and so on by associating with each use and may determine whether or not ABR video transmission is a target to be optimized.

If a buffering phase is detected in step S25 while steps S21 to S32 are repeated, the buffering phase determination part 203A notifies the optimization application part 205A of detection of the buffering phase (S26). The optimization application part 205A performs an optimization processing based on the optimization policy at the time of the buffering phase.

By detecting a buffering phase and changing data transmission bitrate to the client 10 side in the data relay apparatus 20, while the client 10 viewing a video of an ABR delivery scheme, degradation of QoE on the client side is prevented during application of traffic optimization of an ABR video.

Figure 12:
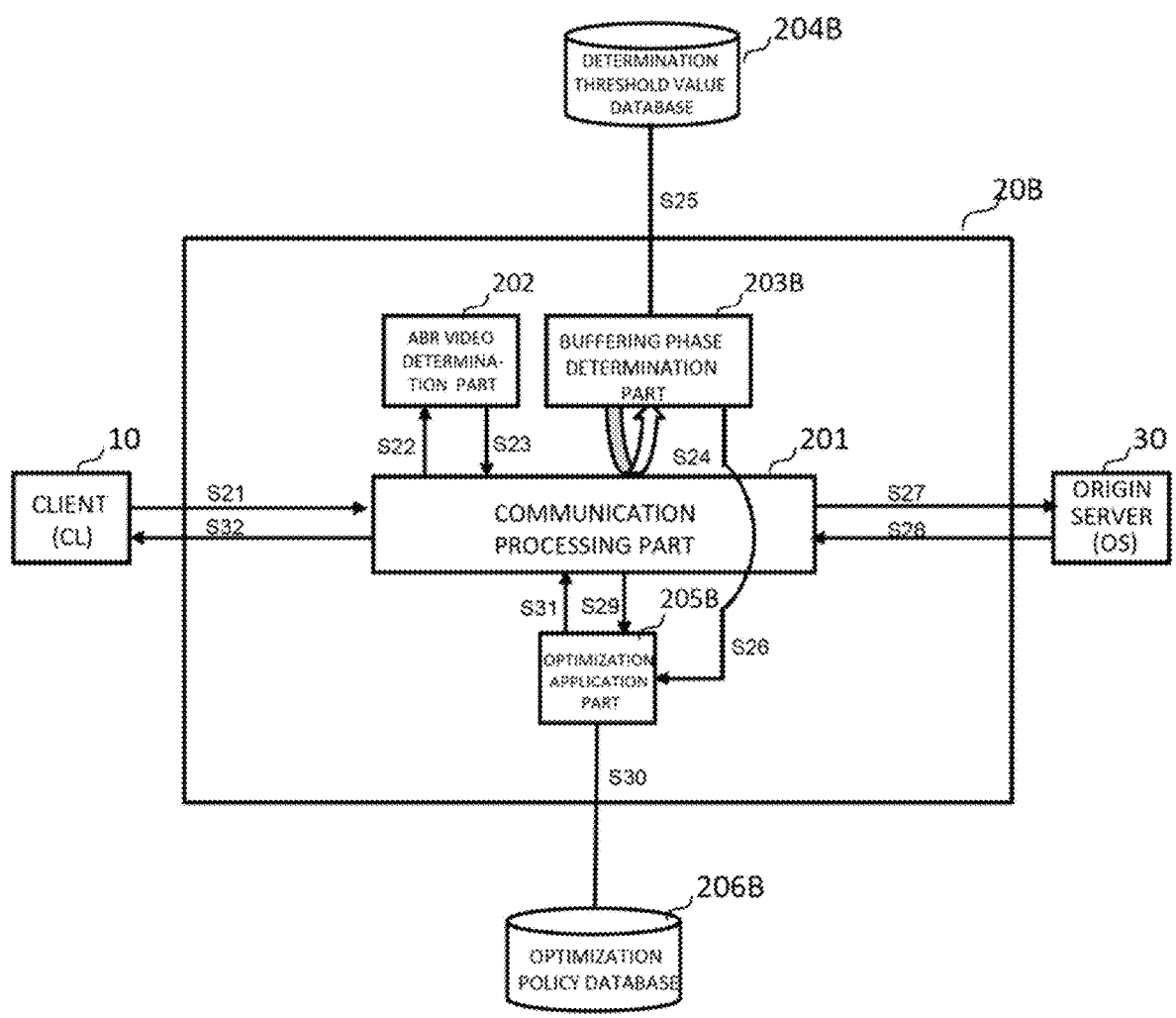
FIG. 12 is a diagram illustrating a configuration example of a data relay apparatus according to another example embodiment of the present invention.

FIG. 12 is a diagram illustrating a variation example according to the example embodiment of the present invention. Referring to FIG. 12, a determination threshold value database 204B and an optimization policy database 206B are arranged outside of a data relay apparatus 20B. The buffering phase determination part 203B is network-connected to the determination threshold value database 204B through a network interface (not illustrated). Furthermore, the optimization application part 205B is network-connected to the optimization policy database 206B through a network interface (not illustrated). Any one of or both of the determination threshold value database 204B and the optimization policy database 206B may be configured to be arranged, for example, in a predetermined node(s) within a core network. Alternatively, any one of or both of the determination threshold value database 204B and the optimization policy database 206B may be arranged in a database of a cloud (data center) to which the data relay apparatus 20B connects through WAN (Wide Area Network) such as internet and so on.

Figure 13:
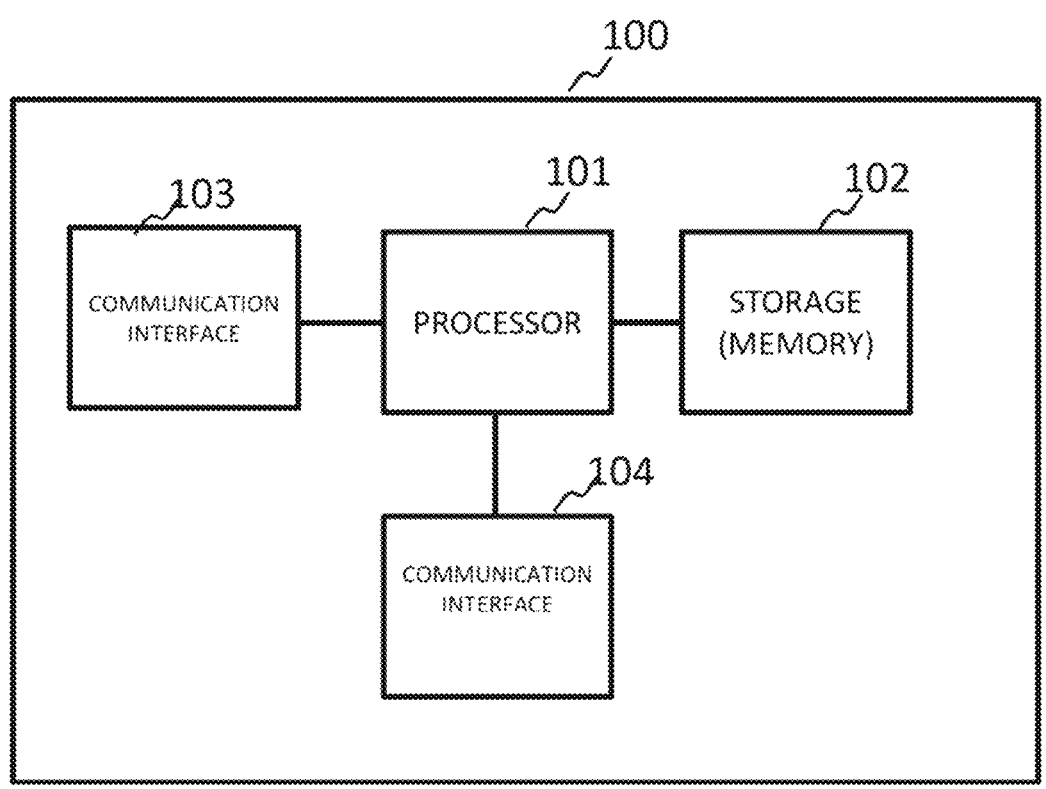
FIG. 13 is a diagram illustrating an implementation example of a data relay apparatus according to an example embodiment of the present invention.

FIG. 13 is a diagram illustrating an example of implementing a data relay apparatus 20 (20A. 20B) of the example embodiments described above in a computer 100. A processor (CPU (Central Processing Unit), data processing apparatus) 101, a storage (memory) 102 including at least any one of a semiconductor memory (e.g., RAM (Random Access Memory), ROM (Read Only Memory), or EEPROM (Electrical Erasable and Programmable ROM) and so on), an USB (Universal Serial Bus), an HDD (Hard Disk Drive), a CD (Compact Disc), a DVD (Digital Versatile Disc) and so on, a first communication interface 103 including a transmitter and a receiver (e.g., a wireless transceiver if the client is the mobile apparatus) for communicating a client (mobile apparatus), and a second interface 104 including NIC (Network Interface Card) for communicating an origin server 30 through a network, are included.

Figure 14:
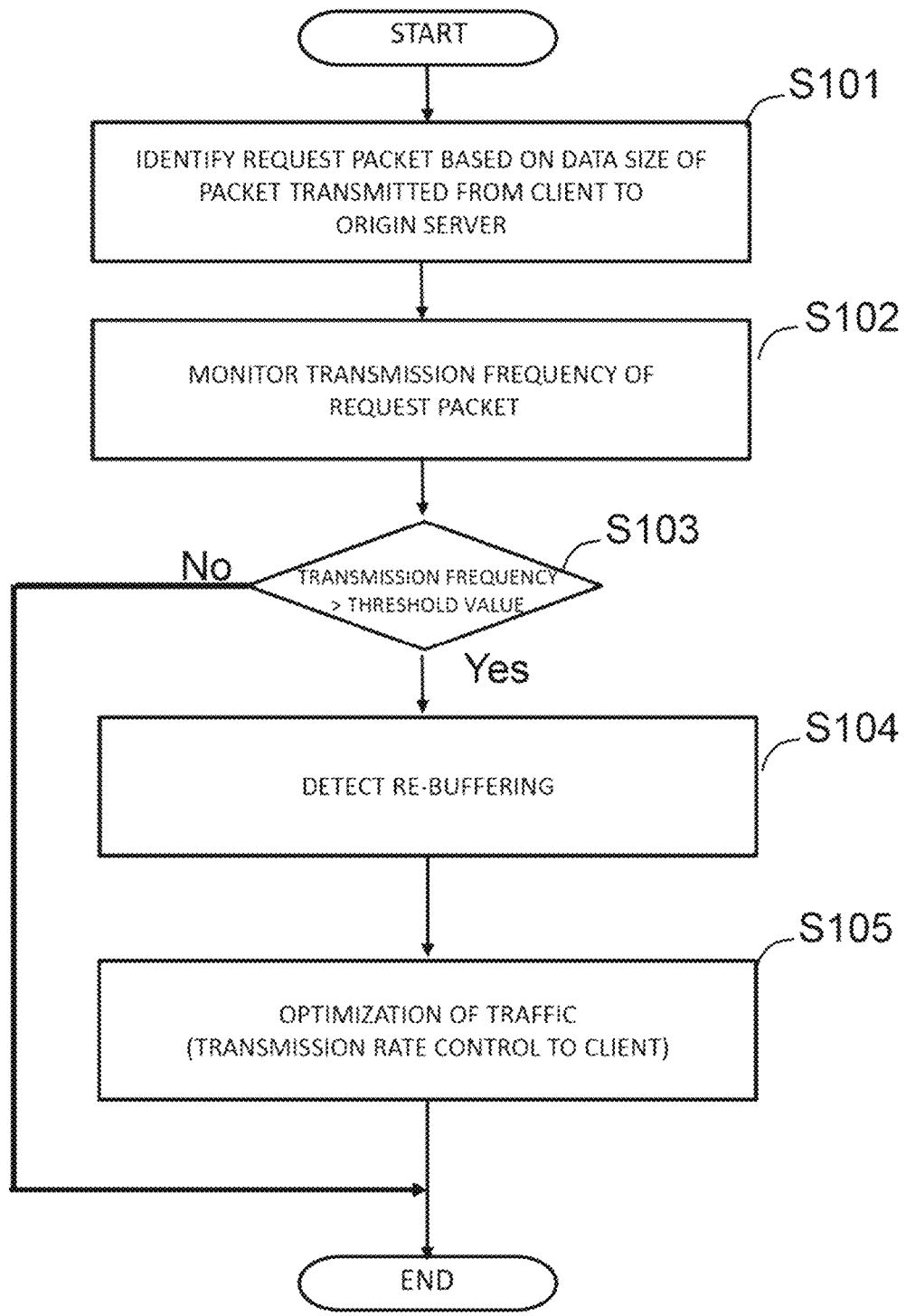
FIG. 14 is a diagram illustrating an operation example of a processor according to an example embodiment of the present invention.

According to the present example embodiment, by storing a program which realizes a function of the data relay apparatus 20 in the storage 102 and reading out and executing the program by the processor 101, processing (a rebuffering detection processing and a traffic optimization processing) for example as illustrated in FIG. 14 is executed.

That is, the processor 101 discriminates a packet based on a data size of a packet that is received through the communication interface 103 and that is transmitted from a client 10 to an origin server 30, and identifies a request packet (predetermined packet) of a video data from the client 10 to the origin server 30 (S101).

The processor 101 monitors a transmission frequency of the request packet (predetermined packet) of the video data from the client 10 to the origin server 30, which is received through the communication interface 103 (S102).

When the transmission frequency of the request packet (predetermined packet) of the video data from the client 10 to the origin server 30 exceeds a predetermined threshold value (Yes of S103), the processor 101 detects that the buffering phase has been entered again (S104). The processor 101 performs optimization of traffic of ABR video delivery (control of transmission bitrate of a response (video data) to be transmitted to the client) (S105).

The computer 100 may, as a matter of course, be operated as the data relay apparatus 20, 20A and 20B in each example embodiment explained with reference to FIG. 10, FIG. 11, and FIG. 12 by the processor's 101 reading out and executing the program.

Although the above example embodiments have been described as application examples of the present invention, the present invention can be applied to communication flow rate control targeted at TCP/UDP communication between a client and an origin server, for example, in mobile communication (cellular network) and also be applied to communication flow rate control targeted at TCP/UDP communication through various access networks, such as wireless or wired LAN, optical fiber, etc. in place of a cellular network.

The data relay apparatus 20 (20A, 20B) in each example embodiment may be arranged between a cache server which caches segment files of the origin server 30 and a client 10.

Each disclosure of the above PTLs 1 to 3 and NPL 1 is incorporated herein by reference thereto and is considered to be described therein, and can be used as a basis and a part of the present invention if needed. Variations and adjustments of the example embodiments and examples are possible within the scope of the overall disclosure (including the claims) of the present invention and based on the basic technical concept of the present invention. Furthermore, various combinations and selections of various disclosed elements (including the elements in each of the claims, example embodiments, drawings, etc.) are possible within the scope of the claims of the present invention. That is, the present invention, as a matter of course, includes various variations and modifications that could be made by those skilled in the art according to the overall disclosure including the claims and the technical concept. In particular, with respect to the numerical ranges described herein, any numerical values or small range(s) included in the ranges should be construed as being expressly described even if not particularly mentioned. Furthermore, each disclosure of above cited documents and also using a part or all thereof by combining with the disclosure of the present application are regarded as being included in the disclosure of the present application, as necessary, in accordance with the gist of the present invention, as a part of the disclosure of the present invention.

What is claimed is:

1. A data relay apparatus arranged between a client apparatus and a server apparatus that delivers content, the data relay apparatus comprising:
 a processor;
 a memory storing program instructions executable by the processor; and
 a receiver that receives a packet which is transmitted from the client apparatus to the server apparatus,
 wherein the processor is configured to:
 discriminate the packet, based on a data size thereof; and
 detect re-buffering at the client apparatus, based on a frequency of transmission of a predetermined packet discriminated.

2. The data relay apparatus according to claim 1, comprising
 a transmitter configured to transmit, to the client apparatus, data received from the server apparatus and destined to the client apparatus,
 wherein the processor is configured to control a transmission rate of the data transmitted by the transmitter to the client apparatus, when the re-buffering is detected.

3. The data relay apparatus according to claim 1 wherein the processor is configured to discriminate whether the packet is a request packet of data from the client apparatus to the server apparatus or an acknowledge (ACK) packet from the client apparatus to the server apparatus, by using a data size of the packet transmitted from the client apparatus to the server apparatus,
 wherein the predetermined packet used for detection of re-buffering is the request packet.

4. The data relay apparatus according to claim 3, wherein the processor is configured to detect the re-buffering, when detecting the frequency of transmission of the request exceeds a predetermined threshold value.

5. The data relay apparatus according to claim 3, wherein request information included in a payload part of the request packet transmitted from the client apparatus to the server apparatus is encrypted.

6. The delivery system, comprising:
 a client apparatus;
 a server apparatus that delivers content; and
 the data relay apparatus according to claim 1.

7. A data relay method, comprising:
 discriminating, by a data relay apparatus arranged between a client apparatus and a server apparatus which delivers content, a packet, based on a data size thereof, the packet transmitted from the client apparatus to the server apparatus; and
 detecting, by the data relay apparatus, re-buffering at the client apparatus, based on a frequency of transmission of a predetermined packet discriminated.

8. The data relay method according to claim 7, comprising:
 controlling, by the data relay apparatus, a transmission rate of data destined to the client apparatus, the data received from the server apparatus, when the re-buffering is detected.

9. The data relay method according to claim 7, comprising
 discriminating, by the data relay apparatus, whether the packet is a request packet of data from the client apparatus to the server apparatus or an acknowledge (ACK) packet from the client apparatus to the server apparatus by using a data size of the packet transmitted from the client apparatus to the server apparatus,
 wherein the predetermined packet used for detection of re-buffering is the request packet.

10. A non-transitory computer-readable medium storing therein a program that causes a computer to execute processing comprising:
 discriminating a packet, based on a data size thereof, the packet transmitted from a client apparatus to a server apparatus that delivers content; and
 detecting re-buffering at the client apparatus, based on a frequency of transmission of a predetermined packet discriminated.

11. The data relay apparatus according to claim 1, wherein the processor is configured to determine whether communication between the client apparatus and the server apparatus is Adaptive Bitrate (ABR) video delivery or not, based on source or destination address information provided in a header of a packet transmitted and received between the server apparatus and the client apparatus, or based on server information included in Transport Layer Security (TLS) handshake between the client apparatus and the server apparatus.

12. The data relay apparatus according to claim 11, wherein the processor is configured to:
 when the communication is determined to be ABR video delivery, obtain, from a threshold database that retains a first threshold value of a packet data size and a second threshold value of a frequency of transmission in association with each server apparatus which delivers content, the first threshold value and the second threshold value corresponding to the server apparatus that delivers content to the client apparatus;
 discriminate whether the packet transmitted from the client apparatus to the server apparatus is a video request packet or an acknowledge (ACK) packet, based on comparison of a data size of the packet with the first threshold value;
 monitor occurrence of transmission of the video request packet from the client apparatus to the server apparatus; and
 detect the re-buffering at the client apparatus when a frequency of transmission of the video request packet exceeds the second threshold value.

13. The data relay apparatus according to claim 12, wherein the processor is configured to:
 obtain, from an optimization policy database that retains an optimization policy including a transmission rate applied to ABR communication, for each user using the data relay apparatus, an optimization policy to be applied in re-buffering; and
 apply optimization according to the optimization policy to ABR vide data received from the server apparatus and destined to the client apparatus.

14. The data relay method according to claim 9, comprising
 detecting the re-buffering, when detecting a frequency of transmission of the request packet exceeds a predetermined threshold value.

15. The data relay method according to claim 9, wherein request information included in a payload part of the request packet transmitted from the client apparatus to the server apparatus is encrypted.

16. The non-transitory computer-readable medium according to claim 10, storing the program causing the computer to execute processing comprising
 controlling a transmission rate of data destined to the client apparatus, the data received from the server apparatus, when the re-buffering is detected.

17. The non-transitory computer-readable medium according to claim 10, storing the program causing the computer to execute processing comprising
discriminating whether the packet is a request packet of data from the client apparatus to the server apparatus or an acknowledge (ACK) packet from the client apparatus to the server apparatus by using a data size of the packet transmitted from the client apparatus to the server apparatus, wherein the predetermined packet used for detection of re-buffering is the request packet.

18. The non-transitory computer-readable medium according to claim 17, storing the program causing the computer to execute processing comprising
detecting the re-buffering, when detecting a frequency of transmission of the request packet exceeds a predetermined threshold value.

19. The non-transitory computer-readable medium according to claim 17, wherein request information included in a payload part of the request packet transmitted from the client apparatus to the server apparatus is encrypted.

\* \* \* \* \*